United States Patent [19]

Dierkes et al.

[11] 3,900,608

[45] Aug. 19, 1975

[54] PREPARATIONS OF OPTICAL BRIGHTENERS

[75] Inventors: Hubert Dierkes, Cologne; Karl Schonol, Leverkusen; Joachim Walter, Hitdorf; Friedhelm Muller, Odenthal, all of Germany

[73] Assignee: Bayer Aktiengesellschaft, Leverkusen-Bayerwerk, Germany

[22] Filed: Oct. 20, 1972

[21] Appl. No.: 299,297

[30] Foreign Application Priority Data
Oct. 23, 1971  Germany.......................... 2152969

[52] U.S. Cl............. 427/158; 8/1 W; 252/301.2 W; 260/308; 260/249.5
[51] Int. Cl.............................................. C09k 3/00
[58] Field of Search ........ 117/33.5 T; 252/301.2 W; 8/1 W; 260/308, 249.5

[56] References Cited
UNITED STATES PATENTS

| | | | |
|---|---|---|---|
| 2,784,183 | 3/1957 | Keller et al..................... | 117/33.5 T |
| 3,357,988 | 12/1967 | Hausermann et al. ......... | 117/33.5 T |
| 3,406,070 | 10/1968 | Oetiker et al............... | 252/301.2 W |
| 3,416,945 | 12/1968 | Zweidler et al................ | 117/33.5 T |
| 3,429,880 | 2/1969 | Hausermann............... | 252/301.2 W |
| 3,475,172 | 10/1969 | Bright et al. .................... | 117/33.5 T |
| 3,485,761 | 12/1969 | Haxby.......................... | 252/301.2 W |
| 3,496,188 | 2/1970 | Wirth.......................... | 252/301.2 W |
| 3,496,189 | 2/1970 | Wirth et al.................. | 252/301.2 W |
| 3,558,316 | 1/1971 | Keberle et al................. | 117/33.5 T |
| 3,754,964 | 8/1973 | Seuret et al................. | 252/301.2 W |

*Primary Examiner*—William R. Trenor
*Attorney, Agent, or Firm*—Plumley & Tyner

[57] ABSTRACT

Preparations of optical brighteners, for the whitening of fiber materials and coating mixtures for paper, which contain the solution of a dispersion brightener (a) in such a colourless organic liquid (b) which is immiscible with water, the boiling point of which is above 150°C and in which the brightener exhibits a minimum solubility of 0.3 g per litre at room temperature, with the solution optionally also containing an emulsifier (c); furthermore a process for the whitening of fiber materials and coating mixtures for paper wherein said solutions are applied.

3 Claims, No Drawings

PREPARATIONS OF OPTICAL BRIGHTENERS

The present invention relates to preparations of optical brighteners; more particularly it concerns preparations of optical brighteners, for the whitening of fibre materials, which contain the solution of a dispersion brightener (a) in such a colourless organic liquid (b) which is immiscible with water, the boiling point of which is above 150°C and in which the brightener exhibits a minimum solubility of 0.3 g per litre at room temperature, with the solution optionally also containing an emulsifier (c).

The present invention further relates to processes for the whitening of fibre materials more particularly it concerns a process for the whitening of fibre materials with dispersion brighteners wherein are used for the whitening of the fibre materials whitener liquors, which contain the dispersion brightener (a) in the form of a solution in such a colourless organic liquid (b) which is immiscible with water, the boiling point of which is above 150°C and in which the brightener exhibits a minimum solubility of 0.3 g per litre at room temperature, with the solution optionally containing an emulsifier (c).

As examples of the organic liquids, to be used as solvents for the brighteners in the preparations according to the invention there should be mentioned:

high boiling ethers such as dibenzyl ether, diphenyl ether and 1-methoxymethyl-naphthalene;

however liquid plasticisers for plastics which are colourless, odourless, water-resistant, light-fast and of low volatility and react neutral in water have proved particularly successful.

The plasticisers characterised by these properties can belong to the most diverse types of plasticisers; for example, phosphoric acid esters, such as diphenyl octyl phosphate, trichloroethyl phosphate or trioctyl phosphate; monocarboxylic acid esters, such as oleic acid methyl ester; hydroxycarboxylic acid esters, such as acetyl-(2-ethylhexyl)-citrate, acetyl-tri-n-butyl-citrate or castor oil; alkanesulphonic acid aryl esters, such as dodecanesulphonic acid phenyl ester or tetradecanesulphonic acid cresyl ester; acetals such as diphenoxyethylformal; chlorinated hydrocarbons, such as chlorinated paraffins containing 40 – 50 % of chlorine; epoxidised fatty acids, such as epoxidised soya bean oil or epoxidised linseed oil; polymeric esters, such as adipic acid polyglycol esters or phthalic acid polyethyleneglycol esters; alkylbenzenes, such as dodecylbenzene.

Dicarboxylic acid ester plasticisers, such as adipic acid dinonyl ester, adipic acid dioctyl ester, sebacic acid dibutyl ester, sebacic acid dioctyl ester and above all phthalic acid esters, such as phthalic acid dibutyl ester, phthalic acid dinonyl ester and phthalic acid benzyl-butyl ester, have proved particularly successful.

By dispersion brighteners there are understood within the present invention optical brighteners which are insoluble respectively poorly soluble in water. These brighteners may belong to the most diverse classes of compounds provided that they do not contain any groups which confer solubility in water. As examples of representatives of the dispersion brighteners to be used in the process according to the invention there may be mentioned:

naphthalic acid imide derivatives, such as 4-methoxy-N-methylnaphthalic acid imide or 4-[3'-methylpyrazolyl-(1)]-N-ethylnaphthalimide; styryltriazole derivatives such as 2-styryl-naphthotriazole or 2-styryl-5-[5'-methyl-6'-N-butoxybenztriazolyl-(1')]-benztriazole or 2-[4'-phenylstyryl]-5-methoxybenztriazole; distyryl derivatives such as 1,4-bis-(2-cyanostyryl)-benzene; pyrazoloquinoline derivatives such as 1,3-dimethyl-4-chloropyrazolo-(3,4-b)-quinoline; pyrene derivatives such as 2,4-dimethoxytriazinyl-(6)-pyrene;benzoxazole derivatives such as 1,2-ethylene-bis-5,5'-methyl-benzoxazole, 5-tert.butyl-2-(diphenylstyryl)-phenyl-benzoxazole, 4,4'-bis- 5-phenyloxazolyl-(1) -diphenyl or 2,5-bis-[benzoxazolyl-(2) ]-thiophene; pyrazoline derivatives such as 1-(4'-aminosulphonyl-phenyl)-3-(4'-chlorophenyl)-pyrazoline, 1-(4'-methylsulphonephenyl)-3-(4'-chlorophenyl)-pyrazoline or 1- 2'-[3''dimethylaminopropyl-(2'')-oxy]-sulfonyl -3-(4'-chlorophenyl)-pyrazoline; carbostyril derivatives, such as 3-phenyl-7-dimethylamino-N-ethyl-carbostyril.

Dispersion brighteners of the coumarine type, such as: 3-phenyl-7-[6-chloro-4-diethylamino-triazinyl-(2)]-amino-coumarine, 3-phenyl-7-ethylcarbamoylcoumarine, 3-[pyrazolyl-(1')]-7-[4'-methyl-5'-phenyltriazolyl-(2')]-coumarine, 3-[4'-chloropyrazolyl-(1')]-7-[3'-methylpyrazolyl-(1')]-coumarine, 3-[4'-chloropyrazolyl-(1')]-7-[4'-methyl-5'-phenyltriazolyl-(2')]-coumarine, 3-[pyrazolyl-(1)]-7-naphtho-[1',2';4,5]-triazolyl(2)-coumarine and especially 3-phenyl-7-[4'-methyl-5'-phenyl-triazolyl-(2')]-coumarine, have proved particularly successful in the process according to the invention.

The preparations according to the invention are advantageously manufactured by dissolving the dispersion brighteners in the organic liquids, if necessary by warming to 40° to 100°C and by optionally adding subsequently to the solutions an emulsifier. The use of emulsifiers is always recommended in the cases where the solutions of the optical brighteners in the organic liquids are applied in aqueous systems.

When using the preparations according to the invention for the optical brightening of fibre materials they are suitable both for whitening from aqueous liquors and for whitening from organic solvents which are immiscible with water such as hydrocarbons, for example benzine or above all aliphatic halohydrocarbons such as tetrachloroethylene.

If aqueous liquors are to be used, there are added to the solutions of the dispersions brighteners (a) in the organic liquids (b) an emulsifier and the mixtures such obtained are diluted with water to the desired concentration.

If whitening is carried out from organic solvents, the solutions of the optical brighteners in the organic liquids are stirred into the solvent without adding emulsifier.

When using the whitener preparations according to the invention for the optical brightening of textile materials it has proved very advantageous in order to prevent degreasing of the organic liquids from the treated textile materials to add to the preparations respectively to the treating liquors compounds which are able to absorb the organic liquids. Such absorbing agents are for example organic compounds which are insoluble respectively poorly soluble in water such as aqueous dispersions of polymers based on polyvinyl acetate, polyacrylic acid esters, acrylic acid ester styrene-copolymers, copolymers from maleic acid anhydride and olefines, aqueous dispersion of self-crosslinking copolymers as are described e.g. in British Pat. No. 898,968 (= U.S. Pat. No. 3,240,740), dispersions of plastics based on polyether-cyclohexane-polyethylene or polyurethanes, furthermore of starch and starch derivates, such as starch ethers e.g. methylated starch, cellulose derivatives such as carboxymethyl cellulose, and long chain alkyl amines and their derivatives as are used e.g. as textile softeners.

The absorbing agents are applied in amounts of about 1 to 25, preferably 1,5 to 15 by weight relative to the weight of the organic liquids.

If the polymer and plastic dispersions are applied in the whitening liquors according to the invention in amounts conventional for textile finishing there is achieved at the same time with the whitening effect also a textile finish.

To dissolve the brightener, 10 to 1,000, preferably 20 – 250, parts by weight of the organic liquid is usually required for one part by weight of brightener.

As emulsifiers it is possible to use anionic, nonionic, ampholytic or cationic emulsifiers.

As examples of anionic emulsifiers there may be mentioned:

a. Carboxylic acids and their salts, such as the sodium, potassium or ammonium salts of lauric, stearic or oleic acids, and acylation products of aminocarboxylic acids and their salts, for example the sodium salt of oleoyl-sarcoside.

b. Sulphates such as fatty alcohol sulphates, for example lauryl sulphate and lorol sulphate, sulphates of hydroxy-fatty acid esters, for example sulphated castor oil, of fatty acid hydroxyalkylamides, for example sulphated coconut fatty acid ethanolamide and sulphates of partially esterified or etherified polyhydroxy compounds, such as sulphated oleic acid monoglyceride or glycerine-ether sulphates, and also sulphates of substituted polyglycol ethers, for example nonylphenolpolyglycol-ether sulphate.

c. Sulphonates, such as primary and secondary alkylsulphonates, for example $C_{12}$–$C_{16}$-paraffinsulphonic acids or their sodium salts, alkylsulphonates with acyl radicals bonded in the manner of an amide or ester, such as oleyl-methyltauride, and sulphonates of polycarboxylic acid esters such as di-iso-octylsulphatosuccinic acid esters; further, sulphonates with aromatic groups, such as alkylbenzene-, for example dodecylbenzene-, alkylnaphthalene-, such as dibutylnaphthalene-, and alkylbenzimidazole-, such as tetradecylbenzimidazole-, sulphonates.

As examples of non-ionic emulsifiers there may be mentioned: esters and ethers of polyalcohols, such as alkylpolyglycol-ethers, for example lauryl alcohol- or oleyl alcohol, polyethylene-glycol-ethers, acylpolyglycol-ethers, such as oleic acid-polyglycol-ethers, alkylaryl-polyglycol-ethers such as the ethoxylation products of nonylphenol and dodecylphenol, acylated amino-alkanol-polyglycol-ethers, and also the known non-ionic surface-active agents which are derived from fatty amines such as stearylamine, fatty acid amides or sugars and their derivatives.

As examles of ampholytic emulsifiers there may be mentioned: alkylbetaines such as dodecyl-dimethylamino-acetic acid, sulphobetaine, such as stearyldimethyl-$\beta$-amino-propane-sulphonic acid, aminocarboxylic acids or ampholytes which are produced from cationic compounds by introduction of acid radicals, such as oleylamido-ethyl-dimethyl-aminoacetic acid.

As examples of cationic compounds there may be mentioned: quaternary ammonium salts such as dodecyl-dimethylbenzyl-ammonium hydrochloride, alkylpyridinium salts such as dodeyl-pyridinium chloride and simple or quaternary imidazoline salts.

The amounts of emulsifiers can vary within wide limits; in general it has proved of value to use 0.5 to 200, preferably 1 to 70, per cent by weight of emulsifier relative to the weight of the organic liquid.

In the use for optical brightening fibre materials it has frequently proved of value to manufacture stock emulsions from the mixtures of whitener, organic liquid and emulsifier by adding smaller amounts of water, say 5 to 500 per cent by weight of water, relative to the weight of the organic liquid. These emulsions can be distributed particularly easily and rapidly in the aqueous treatment bath.

Using the whitener preparations respectively process according to the invention it is possible to whiten materials of both natural and synthetic fibres, continuously discontinuously. As examples of materials of natural fibres which are suitable for whitening according to the process of the invention there may be mentioned:- materials of cellulose fibres, such as cotton, linen and hemp; further, materials of cellulose with a high quality finish, which because of the creaseproof finish have lost their affinity for dyestuffs, for example whiteners; materials of regenerated cellolose, such as viscose and rayon; further, materials of natural ployamides such as wool, silk, hair and furs.

As examples of materials of synthetic fibres which are suitable, for example, for whitening in accordance with the process of the invention, there may be mentioned: fibre materials of synthetic polyamides, such as poly-$\epsilon$-caprolactam, polyhexamethylenediamine adipate and poly-$\omega$-aminoundecanoic acid; polyester materials such as cellulose 2½-acetate, cellulose triacetate, polyethylene terephthalates or polyesters from 1,-4-bis-hydroxymethyl-cyclohexane and terephthalic acid, and polycarbonates from 4,4'-dioxy-diphenyl-2,2-dimethylpropane; also, materials of polyacrylonitrile,- polyurethanes or polyolefines.

For whitening according to the exhaustion process, the fibre materials are agitated, using a liquor ratio of 1 : 5 to 1 : 100, preferably 1 : 5 to 1 : 10, in a liquor which contains 0.001 g to 0.5 g of dispersion brightener and corresponding amounts of organic liquids per litre, for 1 to 60 minutes, preferably 5 to 10 minutes, at temperatures of 20° – 100°C, preferably 20° – 40°C. Thereafter, the whitened materials are dried, if necessary after brief rinsing. It should be pointed out that the degree of whiteness of the treated materials can be increased by repeating the treatment several times. Further, an additional increase in the white effects can be achieved by adding the customary shading dyestuffs.

In the whitening according to the invention, using the impregnating process, the fibre materials are padded at 20° – 45°C with liquors which contain 0.0025 g to 10 g of dispersion brightener and corresponding amounts of organic liquids per litre. After squeezing-out and drying, excellent white effects are obtained.

With the aid of the process according to the invention it proves possible to produce excellent whitening of fibre materials of the most diverse kinds by means of dispersion brighteners under mild conditions (room temperature). The white effects are largely fast to rinsing in water and show good fastness to washing even at washing temperatures of up to 60°C. With some types of whitener white effects of light fastness higher than 4 are even achieved on wool, on which only white effects of low fastness to light are achieved in accordance with the conventional whitening processes. Further, materials of cotton with a high quality finish can also be whitened with the aid of the process according to the invention, though these materials have lost their affinity for dyestuffs as a result of the creaseproof finish, and could hitherto therefore not be brightened optically.

When using the whitener preparations according to the invention from organic solvents which are immiscible with water, the white effects are already fully developed after the solvents has been removed, so that no after-treatment, such as steaming, is required.

The parts indicated in the Examples which follow are parts by weight, unless otherwise stated.

EXAMPLE 1

200 parts of completely bleached wool are agitated for 5 minutes at 25°C, using a liquor ratio of 1 : 5, in a whitener liquor which are obtained by stirring 25 parts of the whitener preparation described below into 975 parts of water. Thereafter the wool is dewatered by centrifuging and is then dried.

A wool showing excellent brightening is obtained, which has a substantially higher degree of whiteness than the completely bleached starting wool.

An equivalent whitening was obtained when instead of the wool employed the same amount of one of the fibre materials described below was used: a) a heavy-weave cotton fabric, (b. cotton poplinwith a high quality finish, c) a woven poly-ε-caprolactam fabric or d) a knitted polyacrylonitrile fabric.

The whitener preparation used was manufactured as follows: 5 parts of 3-phenyl-7-[4'-methyl-5'-phenyl-triazolyl-(2')]-coumarine were dissolved in 745 parts of diphenyl octyl phosphate whilst stirring and warming to about 80°C. 20 parts of dodecylbenzenesulphonate (100% strength) were first stirred into this solution, followed by 230 parts of water.

EXAMPLE 2

200 parts of a polyester fabric are agitated for 10 minutes at room temperature, using a liquor ratio of 1 : 10, in a whitener liquor which was obtained by stirring 30 parts of the whitener preparation described below into 1970 parts of water. The whitened material was taken out of the liquor and divided into two parts. One part was dewatered by centrifuging and then dried. The other part was twice rinsed for 2 minutes at room temperature in fresh water (liquor ratio 1 : 10) and was subsequently also dewatered by centrifuging and dried. A good whitening was obtained on both fabrics. The optical brightening of the two fabrics which received the different after-treatments is practically identical in shade and intensity. This shows that the whitening produced at the same time possesses good fastness to water.

The whitener preparation used was manufactured as follows:

5 parts of 2-styryl-naphthotriazole were dissolved in 700 parts of dibutyl phthalate whilst stirring and warming to 70° – 80°C. Thereafter 30 parts of dodecylbenzyl-ldimethyl-ammonium chloride were stirred into the solution.

Equivalent preparations were also obtained if instead of dibutyl phthalate the same amount of dioctyl phthalate, di-nonyl phthalate or benzyl-butyl phthalate was employed.

EXAMPLE 3

100 parts of various textile fabrics (20 parts of bleached heavy-weave cotton, 20 parts of fully bleached wool muslin, 20 parts of poly-ε-caprolactam fabric, 20 parts of polyacrylonitrile fabric and 20 parts of polyethylene terephthalate fabric) are agitated for 10 minutes at room temperature, using a liquor ratio of 1 : 10, in a whitener liquor which has been obtained by stirring 20 parts of the whitener preparation described below into 980 parts of water. Thereafter the fabrics are dewatered by centrifuging and dried in air. All five test fabrics show an excellent whitening.

The whitener preparation used was manufactured as follows: 7 parts of 2,5-bis-[benzoxazolyl-(2)]-thiophene were dissolved in 800 parts of sebacic acid dibutyl ester whilst stirring and warming to 70° –80°C. 15 parts of $C_{12}$–$C_{15}$-paraffin sulphonate and 10 parts of lauryl alcohol sulphonate were first stirred into the solution, and 168 g of water were subsequently stirred in. An equivalent preparation was obtained if instead of the sebacic acid dibutyl ester the same amount of sebacic acid dioctyl ester was used.

Equivalent brightening effects were also obtained if instead of the preparation a) employed, the same amount of one of the preparations b) or c) described below was used.

Preparation b.

5 parts of 3-[4'-chloropyrazolyl-(1')]-[4'-methyl-5'-phenyl-triazolyl-(2')]-coumarine were dissolved in 700 parts of adipic acid dinonyl ester whilst stirring and warming to 70° – 80°C. 20 parts of lauryl alcohol sulphate were first stirred into the solution, followed by 275 parts of water. An equivalent preparation was obtained if instead of the adipic acid dinonyl ester the same amount of adipic acid dioctyl ester was employed.

Preparation c.

5 parts of 3-phenyl-7-[4'-methyl-5'-phenyl-triazolyl-(2')]-coumarine were dissolved in 600 parts of chlorinated paraffin (Cl content: 40%). 15 parts of nonyl-phenol-decapolyethylene glycol-ether were first emulsified in the solution, followed by 380 parts of water.

EXAMPLE 4

100 parts of a poly-ε-caprolactam knitted fabric free of whitener are agitated for 5 minutes at room temperature, using a liquor ratio of 1 : 10, in a whitener liquor which was obtained by stirring 10 parts of the whitener preparation described below into 990 parts of water. The knitted fabric is subsequently twice rinsed with fresh water at 20°C (liquor ratio 1 : 10), and then dewatered and dried. A good whitening is achieved, which can be substantially increased by repeating the treatment several times (for example 5 times).

Equivalent white effects were also obtained on fabrics of polyethylene terephthalate, polyacrylonitrile and viscose.

The whitener preparation used was obtained as follows: 5 parts of 2,5-bis-[benzoxazolyl-(2)]-thiophene were dissolved in 750 parts of epoxidised linseed oil. Thereafter, 20 parts of dodecylbenzenesulphonate were first stirred into the solution, followed by 225 parts of water. An equivalent preparation was obtained if instead of the epoxidised linseed oil the same amount of expoydised soya bean oil was employed.

EXAMPLE 5

Polyacrylonitrile fabric free of whitener is padded at room temperature with a whitener liquor which was obtained by diluting 200 parts of the whitener preparation described below with a mixture of 760 parts of water and 40 parts of a 40 % strength aqueous polyvinyl acetate dispersion. The fabric is squeezed-out to a weight increase of 80 % and dried. An excellent white effect is obtained.

Equivalent white effects were also obtained on polyethylene terephthalate fabric, cotton poplin and wool muslin.

The whitener preparation used was manufactured as follows: 5 parts of 3-phenyl-7-[4'-methyl-5'-phenyltriazolyl-(2')]-coumarine, 0.004 part of Disperse Violet 1 (C.I. No. 61,100) and 0.004 part of Disperse Violet 8 (C.I. No. 62,030) were dissolved in 700 parts of epoxidised soya bean oil. Thereafter 20 parts of dodecylbenzenesulphonate were first stirred into the solution, followed by 275 parts of water.

EXAMPLE 6

Bleached cotton poplin is uniformly sprayed at room temperature, up to a weight increase of about 100%, with a whitener liquor which was obtained by diluting 100 parts of the whitener preparation described below with 900 parts of water. Thereafter, the fabric is dried. The resulting fabric is distinguished by a high degree of whiteness.

The whitener preparation used was manufactured as follows: 2.5 parts of 3-phenyl-7-ethylcarbamoylcoumarine and 2.5 parts of 2,5-bis-[benzoxazolyl-(2)]-thiophene were dissolved in 750 parts of adipic acid-ethylene glycol polyester. Thereafter, 45 parts of $C_{12}$–$C_{16}$-paraffin sulphonate were first stirred into the solution, followed by 200 parts of water.

EXAMPLE 7

A mixed fabric of polyacrylonitrile/wool (60/40) is padded at room temperature with a whitener liquor which was obtained by stirring 250 parts of the whitener preparation described below into 750 parts of water. The fabric is squeezed-out to a weight increase of 80% and dried. An excellent whitening is obtained.

The whitener preparation used was obtained as follows: 5 parts of 4-methoxy-N-methyl-naphthalimide were dissolved in 250 parts of castor oil and 250 parts of phthalic acid-ethylene glycol polyester whilst stirring and warming to 70° – 80°C. 40 parts of nonylphenol-decaethylene glycol-ether were first stirred into the solution, followed by 200 parts of a 30 % strength aqueous dispersion of an acrylic acid butylester copolymer.

EXAMPLE 8

100 parts of a polyacrylonitrile-wool mixed fabric (67/33) are agitated for 5 minutes at room temperature, using a liquor ratio of 1 : 10, in a whitener liquor which was obtained by diluting 30 parts of the plastics dispersion containing whitener, described below, with 970 parts of water. Thereafter the fabric is dewatered by centrifuging and dried. The fabric has an excellent finish and shows excellent whitening.

The plastics dispersion containing whitener which was used was obtained by mixing 300 parts of the whitener preparation described in Example 1 with 700 parts of a 40% strength polyvinyl acetate dispersion.

EXAMPLE 9

A polyethylene terephthalate fabric is impregnated at room temperature with a liquor which was obtained by stirring 10 parts of the whitener preparation described below into 140 parts of tetrachloroethylene. The fabric is squeezed-out to a weight increase of 100% and the solvent is removed by evaporation. A polyester fabric showing excellent whitening is obtained.

Equivalent white effects were also obtained on fabrics of wool, cotton and polyacrylonitrile if the same procedure was used. Instead of the 140 parts of tetrachloroethylene 90 parts of benzine, such as is usually employed in dry cleaning plants, can be used with equal success.

The whitener preparation used was manufactured as follows: 1 part of 3-phenyl-7-[4'-methyl-5'-phenyl-triazolyl-(2')]-coumarine is dissolved in 90 parts of $C_{12}$–$C_{16}$-paraffin-sulphonic acid cresyl ester whilst stirring and warming to about 80°C.

EXAMPLE 10

100 parts of a whitener-free polyethylene terephthalate curtain fabric are treated for 5 minutes at room temperature, using a liquor ratio of 1 : 10, in a whitener liquor which was obtained by stirring 50 parts of the whitener preparation shown below into a mixture of 940 parts of water and 10 parts of a 40 % strength aqueous dispersion of a styrene-acrylonitrile copolymer. The curtain fabric is subsequently dewatered and dried. A good whitening is obtained.

The whitener dispersion used was manufactured as follows: 8 parts of 1-(4'-aminosulphonylphenyl)-3-(4'-chlorophenyl)-pyrazoline were dissolved in 750 parts of benzyl butyl phthalate by stirring at a temperature of 80°C. 20 parts of $C_{12}$–$C_{16}$-paraffin sulphonate were first stirred into the solution, followed by 222 parts of water.

EXAMPLE 11

100 parts of polyester curtain fabric are agitated for 10 minutes at room temperature, using a liquor ratio of 1 : 20, in a whitener liquor which was obtained by stirring 25 parts of a whitener preparation described below into 975 parts of water. The fabric is subsequently removed from the liquor, squeezed out and dried at room temperature.

A curtain fabric is obtained which shows excellent whitening and is also pleasantly firm to the touch.

The whitener preparations employed were prepared as follows:

Preparation a.

0.15 parts of 3-phenyl-7-[4'-methyl-5'-phenyltriazolyl-(2')]-coumarine were dissolved in 45 parts of benzyl-butyl-phthalate whilst stirring and heating to 80°C. 3 parts of a 30% aqueous $C_{12}$–$C_{15}$-paraffin sulphonate solution were first stirred into the solution, followed by 36.85 parts of water and 15 parts of a 40% aqueous polyvinylacetate.

Preparation b.

0.15 parts of 3-phenyl-7-[4'-methyl-5'-phenyltriazolyl-(2')]-coumarine were dissolved in 45 parts of benzyl-butyl-phthalate whilst stirring and heating to 80°C. 8 parts of a 30% aqueous $C_{12}$–$C_{15}$ paraffin sulphate solution were first stirred into the solution, followed by 36.85 parts of a 3.3% aqueous carboxy methylcellulose solution and 10 parts whiting.

Preparation c.

0.15 parts of 3-phenyl-7-[4'-methyl-5'-phenyltriazolyl-(2')]-coumarine were dissolved in 45 parts of dodecane sulphonic acid phenylester whilst stirring and heating to 80°C. 3 parts of a 30% aqueous $C_{12}$–$C_{15}$ paraffin sulphonate solution were first stirred into the solution, followed by 36.85 parts of a 5% aqueous polyvinyl alcohol solution and 15 parts of a 40% aqueous styrene acrylontrile copolymer dispersion.

Preparation d.

0.2 parts of 3-phenyl-7-[4'-methyl-5'-phenyl-triazolyl-(2')]-coumarine were dissolved at 80°C in 8 parts of adipic acid polyglycol ester whilst stirring. After the addition of 13 parts of an approximately 40% aqueous dispersion of an acrylic acid butyl ester/styrene copolymer, which contains 6% of benzyl-p-oxydiphenyl-dodecaethylene glycol ether. 0.2 parts of an acrylic acid divinyl benzene copolymer, 0.2 parts of ammonia (25%) and 78.4 parts of water were also emulsified in the mixture.

EXAMPLE 12

100 parts of bleached cotton fabric are agitated for 10 minutes at room temperature, using a liquor ratio of 1 : 20, in a whitener liquor which was obtained by stirring 10 parts of the whitener preparation described below into 990 parts of water. The fabric was subsequently squeezed out and dried.

The treated cotton fabric is distinguished by a high degree of whiteness and is pleasantly soft to the touch.

Using the same method of working an equivalent whitening and an equivalent improvement in touch was also be obtained on materials from regenerated cellulose and from natural and synthetic polyamides.

The whitener preparation employed was manufactured as follows:

0.25 parts of 3-phenyl-7-[4'methyl-3'-phenyl-triazolyl-(2')]-coumarine were dissolved in 24.75 parts of phthalic acid-benzyl-butylester whilst stirring and heating to 80°C. Thereafter 5 parts of dimethyl-N,N-distearyl ammonium chloride, followed by 1 part of nonylphenol-decapolyethylene glycol ether and 69 parts of water were emulsified in the solution whilst stirring.

EXAMPLE 13

Bleached wool is impregnated at room temperature with one of the whitener liquors described below, squeezed to a weight increased of 100% and then dried at 100°C. The feltless wool such obtained is distinguished by a high degree of whiteness which is not impaired by wet washing.

The whitener liquors employed were produced as follows:

a. 30 parts of a prepolymer prepared from hexamethylene diisocyanate and from a polyester (mol. weight 3000) which was obtained by the propoxylation of trimethylol propane, 0.3 parts of 3-phenyl-7[4'-methyl-5'-phenyltriazolyl-(2')]-coumarine and 29.7 parts of phthalic acid benzyl butyl ester were dissolved in 940 parts of perchloroethylene.

b. 0.3 parts of 3-phenyl-7-[4'-methyl-3-phenyl-triazolyl-(2')]-coumarine were dissolved in 29.7 parts of dodecane sulphonic acid phenylester whilst stirring and heating to 80°C. To the solution there were then added 40 parts of a prepolymer prepared from hexamethylene diisocyanate and from a polyether (mol. weight 3000) obtained by propoxylation of trimethylolpropane, 20 parts of benzyl-p-oxydiphenyl-decaethylene glycol ether and 20 parts of $C_{12}$–$C_{15}$ paraffin sulphonate. Thereafter 890 parts of water and 10 parts of a styrene copolymer dispersions (40%) were emulsified in the mixture.

We claim:

1. A process for whitening of formed fiber materials consisting essentially of treating the formed fibers at temperatures of from 20°–40°C with a whitener liquor which consists essentially of (I) a solution of a dispersion brightener in an organic solvent which is a water immiscible liquid having a boiling point above 150°C and in which the whitener has a minimum solubility at room temperature of 0.3 grams per litre wherein the dispersion brightener is selected from the class consisting of naphthalic acid imides, styryl-triazoles, distyryl derivatives, pyrazoloquinolines, pyrenes, benzoxazoles, pyrazolines, carbostyrils, and coumarines, and wherein the organic solvent is selected from the class consisting of high boiling ethers, phosphoric acid esters, monocarboxylic acid esters, hydroxy carboxylic acid esters, alkanesulfonic acid aryl esters, acetals, epoxidized fatty acids, polymeric esters, alkylbenzenes and dicarboxylic acid esters, in (II) a member selected from the group consisting of aqueous liquors containing an emulsifier for the composition (I) or a water immiscible organic solvent.

2. The process according to claim 1, wherein the aqueous whitener liquor additionally contains a compound which is able to absorb the organic liquid.

3. Process of claim 2 wherein the whitener liquor contains an absorbing agent selected from the group consisting of polyvinylacetate; polyacrylic acid esters, acrylic acid esters, styrene copolymers, copolymers from maleic acid anhydrides and olefines; self cross-linking copolymers from 0.5–10% by weight of an olefinically unsaturated monomer with at least one hydrophilic group, 0.5–15% by weight of a methylol ether and/or a Mannich base of acrylic or methacrylic acid amide and at least one further oelfinically unsaturated monomer which is capable of copolymerizing with and; plastics based on polyethercyclohexane-polyethylene or polyurethanes; starch or starch derivatives; cellulose derivatives or long chain alkyl amines or their derivatives.

* * * * *